Oct. 12, 1965        W. R. GRAMS ETAL        3,211,967
SOLION WITH GRAPHITE SEPARATORS AND ELECTRODES
Filed June 28, 1961
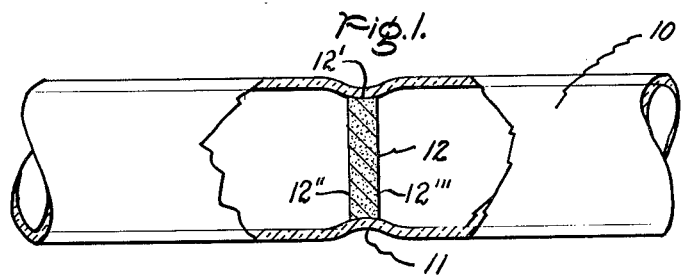
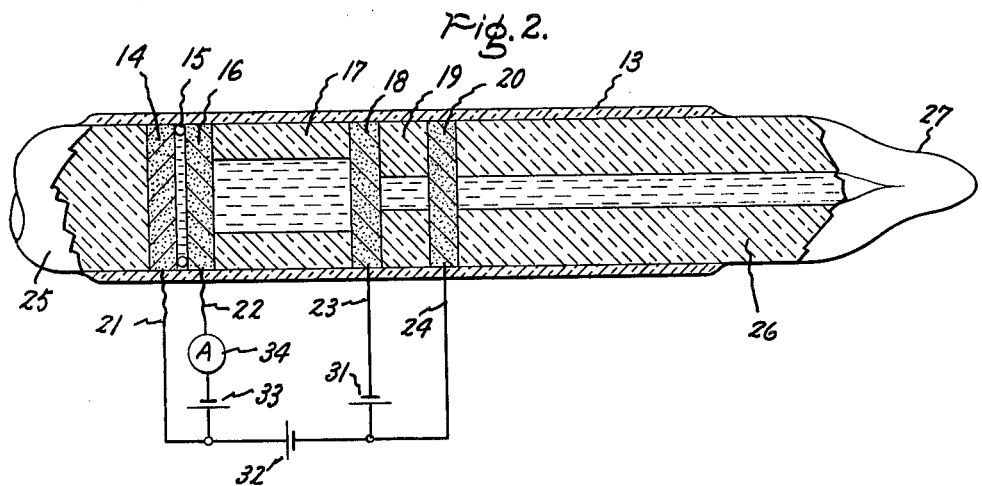
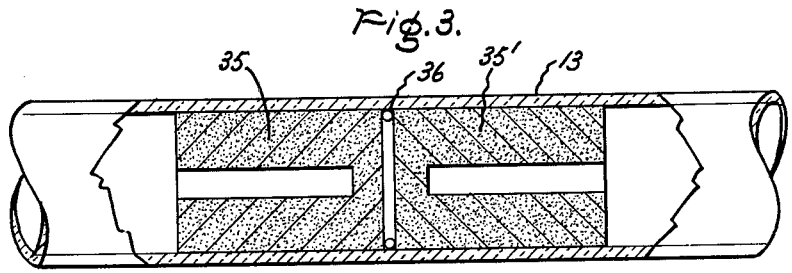
Inventors:
William R. Grams,
Joseph L. Weininger,
by James J. Lichiello
Their Attorney.

United States Patent Office 3,211,967
Patented Oct. 12, 1965

3,211,967
SOLION WITH GRAPHITE SEPARATORS
AND ELECTRODES
William R. Grams, Ballston Spa, and Joseph L. Weininger, Scotia, N.Y., assignors to General Electric Company, a corporation of New York
Filed June 28, 1961, Ser. No. 120,238
7 Claims. (Cl. 317—231)

This invention relates to electrochemical devices such as solions incorporating porous graphite electrodes, and more particularly, to a solion integrator assembly utilizing porous graphite electrodes.

A solion is a precision electrochemical cell, and in one form, includes in a suitable housing designed to contain spaced electrodes of, for example, platinum or a platinum alloy, and an electrolytic solution such as potassium iodide and iodine dissolved in a solvent. Such a device is employed to store electrical information in the form of ions, on integrate, store and deliver electrical signals. Solions generally operate on the principle of concentration (diffusion) polarization and find widespread use as diodes, integrators, multipliers, amplifiers, detectors, etc.

In copending application Serial No. 120,240, filed concurrently herewith and assigned to the same assignee as the present invention, there is disclosed the construction and method of assembly of a solion device employed as an integrator. Briefly, there is described and illustrated a solion integrator of tubular form, for example, a glass tube containing a plurality of disk-like electrodes, intermediate spacers and barriers, positioned in parallel coaxial relationship. The tube is filled with a suitable aqueous electrolyte solution such as potassium iodide and iodine, or any other satisfactory oxidation reduction couple and operation of the device depends upon oxidation and reduction of the electrolyte ions at the various electrodes. This oxidation and reduction is reversible and such systems are termed redox systems.

Optimum operation of a solion is only achieved where materials of construction are so chosen as to be inert with respect to the electrolye and, therefore, it is desirable to employ such metals as platinum and its noble metal alloys, for the electrodes, and various glasses such as Pyrex glass for the housing, separators and barriers. Since the device is a precision one, with critical spacings, for example, between an integrator anode and cathode, the combination of Pyrex glass and platinum leads to temperature expansion mismatch characteristics which affect critical dimensions.

The operation of a solion device requires a circuit through the electrolytic solution while at the same time necessitating a barrier to control and greatly reduce the back flow of ions from one electrode to another after separation of the oxidized species of the redox couple occurs through oxidation and reduction of the electrolyte. The barrier must be of a predetermined porosity and a fine glass or Pyrex glass frit is usually employed. In the integrator portions of a solion, a preferred electrode has been a fine 80 mesh platinum screen or gauze which must be sufficiently open or porous to provide an electrolyte circuit, yet be closed enough so that ions do not pass therethrough without becoming oxidized or reduced. It is obvious that the strenuous requirements lead to a compromise restricting the range of materials that may be employed to those, as indicated, which are uneconomical, have temperature expansion mismatch characteristics and sealing problems. It has been discovered that a combination of borosilicate glasses together with porous graphite electrodes provides a more economical and efficient solion while at the same time facilitating assembly thereof.

Accordingly, it is an object of this invention to provide an improved solion device.

It is another object of this invention to provide an improved porosity element in a solion integrator.

It is another object of this invention to provide an improved electrode material for solion devices.

It is a further object of this invention to combine a porosity element with an electrode in a solion integrator.

It is still another object of this invention to provide a combined graphite electrode and porosity element in a solion integrator.

Briefly described, this invention includes the use of predetermined porosity graphite disks in a solion integrator in a glass housing where a satisfactory tight interface or seal is provided between the graphite and glass. The tight interface or seal is such that the solution leakage therethrough does not exceed the porosity of the graphite. The graphite acts both as a porosity element or barrier and as an electrode. The tight interface will hereinafter be referred to as the seal.

This invention will be better understood when taken in connection with the following description and the drawing in which:

FIG. 1 is a schematic cross-sectional illustration of a disk electrode sealed into a glass tube;

FIG. 2 is a cross-sectional illustration of a preferred arrangement of parts in their assembled relationship and a circuit therefor; and FIG. 3 is an illustration of a modified cup shaped electrode.

It has been discovered that a graphite electrode with optimum porosity, for example, corresponding to a density in the range of about 1.60 to 1.70 grams/cm.$^3$ may be properly sealed, as described, into a glass chamber or tube without producing any undue strain in the glass. Various glasses and other materials may be employed, however, with the requirement that they are not leached by the electrolyte or otherwise introduce impurities therein because a solion device is extremely sensitive to impurities. A preferred glass in accordance with this invention is a chemically inert, heat resistant, low expansion borosilicate glass denoted as Pyrex glass. A glass tube or envelope is also desirable for a solion device because of ease of handling, hermetically sealing, and ease of assembly of related parts.

A method of providing a porous graphite electrode in disk form in a Pyrex glass tube is described in conjunction with FIG. 1. In FIG. 1, a Pyrex glass commercially available as (7740) tube 10 includes a necked down or reduced portion 11 therein with a graphite disk 12 (density of 1.65 grams/cm.$^3$) positioned within the necked down portion 11. A graphite electrode in one preferred form of this invention is spectroscopically pure graphite of about $1/16$ inch thickness which has been cleaned of loose graphite particles. The $1/16$ inch thickness defines a rim 12' which is engaged by the necked down portion 11 thus leaving full side surfaces 12" and 12''' of electrode 12 exposed. One method of cleaning employed includes subjecting the graphite to ultrasonic vibration while submerged in distilled water. In the sealing process, graphite disk 12 is coaxially located within glass tube 10 and in its final position. Glass tube 10 is then collapsed under heat and pressure to the rim of the graphite disk. One method of collapsing tube 10 about disk 12 includes evacuating the interior of tube 10 to low pressures while heating the tube at the disk 12 periphery. The process provides at least a partial introduction of glass into the pore structure of graphite disk 12. It can thus be seen that graphite disk 12 separates tube 10 into two chambers in a similar manner as would be accomplished by the use of a glass frit. Graphite is not only a good electrical conductor, but is satisfactorily inert with respect to a solion electrolyte, for example, potassium iodide and iodine.

When employed as an electrode in a solion integrator, a graphite electrode does not need a further backing or support member as may be required for a platinum screen. At the same time, the graphite electrode also serves as a diffusion barrier replacing glass frits in many applications. An additional advantage lies in the use of a material of optimum porosity having sufficient depth to prevent passage of ions therethrough without being oxidized or reduced. Finally, mismatch effects of prior platinum electrodes and other material combinations are minimized because the temperature coefficient of expansion of graphite more closely matches that of, for example, Pyrex glass.

A novel solion device utilizing the discovery of a graphite electrode disk sealed within a Pyrex glass tube is illustrated in FIG. 2.

In FIG. 2 a Pyrex glass or other suitable glass tube 13 is employed as a housing or envelope for a solion device, a solion integrator in this instance. Within tube 13 there is coaxially positioned a first graphite disk 14, being the integrator anode, and which may be either porous or non-porous graphite. It is not necessary that anode 14 be porous because no electrolyte circuit is required therethrough. Porosity in some applications provides a greater surface exposed to the electrolyte. One or more spacers 15 of very small diameter, about 1 mil, and which are suitably shaped in the form of, for example, a hairpin, are placed adjacent graphite disk 14 to define the distance of separation of the integrator electrodes. Spacer 15 is also chosen from those materials which are inert and non-conducting with respect to the electrolyte, for example, a suitable glass or, in this example, fused quartz. Thereafter, a second porous graphite disk 16, which is the integrator cathode, is placed against the quartz fiber 15 coaxially with and parallel to disk 14. When assembling solion devices of such small size (0.01 to 0.1 inch³ overall internal volume), it can be seen that critical electrode spacing is more easily maintained than with metal mesh electrodes. The spacing between graphite electrode disks 14 and 16 is critical and may be on the order of about 0.001 inch. The enclosed volume between electrodes 14 and 16 may be on the order of 0.00005 inch³. A thin quartz, or similar material spacer 17 is then placed against graphite electrode 16. Thereafter, a further graphite disk 18 which is a separation cathode is placed against quartz spacer 17 to define with electrode 16 the cathode separation space, i.e., a volume of the solion which will contain electrolyte solution essentially free of oxidized iodine. A further spacer or washer 19 is placed adjacent disk 18 to be followed by a further porous graphite disk 20. Spacer 19 is also of an inert material and in this example was of Pyrex glass. Graphite disks 18 and 20 are separation cathodes and anodes, respectively.

In order to provide electrical connection to the graphite electrodes, electrical leads or prongs 21, 22, 23 and 24 are provided for each of the graphite disks 14, 16, 18 and 20, respectively. One method of providing for the attachment of platinum leads 21–24 to the graphite electrode disks 14, 16, 18 and 20 and bringing them out of Pyrex glass tube 13 is as follows. A small hole is drilled in the graphite and platinum is melted in the hole. Molten platinum, in solidifying, provides a firm bond with the graphite. Thereafter, very thin platinum foil of about 0.2:1.0 mil thick is spot welded to this solidified platinum. The foil is then utilized for attachment of the leads before or after assembly of the solion. In one method of assembly, tube 13 includes an axial slot in the wall thereof, and a Pyrex rod 25 fitting smoothly into one end thereof. The electrodes and spacers are then positioned in tube 13 in the arrangement as illustrated in FIG. 2. The graphite electrodes with the foil and leads attached are easily placed in tube 13 with the foil in the slot. A chamber tube 26 is then fitted in the other end of tube 13. Chamber tube 26 is provided with a constricted portion 27 to be utilized for sealing the unit after the electrolyte has been added and an air space provided. After positioning the electrodes and spacers in tube 13, chamber tube 26 or rod 25 is generally adjusted so that the assembled parts fit snugly together and rigid alignment is maintained. The foil parts are then sealed to tube 13 by melting Pyrex glass in the slot about the foil parts. Thereafter rod 25 and chamber tube 26 are fused or sealed to tube 13. Tube 13 is evacuated through constriction 27 and sealing of the electrodes is accomplished as described.

One advantage achieved by this arrangement is the provision of all leads in such a close position that suitable prongs may be attached thereto and the unit easily plugged into a circuit receptacle. Another advantage is the elimination of leads passing axially through the tube and the parts therein with the inherent danger of being exposed to different concentrations of electrolyte in the different chambers with resultant erroneous operation.

A new and novel solion integrator as described has the advantage of replacing expensive parts used in previous integrators by simpler materials, i.e., porous graphite which, in turn, provides a much simpler construction, and a smaller and more economical unit. A further feature is the use of porous graphite disks as combined electrodes and porous plugs to impede the flow of electrolyte solutions in solion devices to reduce diffusion current. Tests on the assemblies as described and illustrated indicate sealing and alignment to be satisfactory with operation of graphite electrodes being more effective than their platinum counterparts under most conditions, one exception being, however, as the anode of a solion integrator where response time is critical. Under these conditions the anode is usually impervious.

A simple operation of solions made in accordance with FIG. 2 is explained in conjunction with the circuit of FIG. 2. Referring again to FIG. 2, in order to separate iodide and iodine, electrodes 14, 16 and 18, may initially be connected to a negative side of a battery and electrode 20 to the positive side. This provides a quick separation because iodine is reduced at electrodes 14, 16 and 18 to iodide and an equivalent amount of iodide is oxidized at electrode 20 to iodine. Another way of describing this principle is that for each iodine ion being reduced at electrodes 14, 16 and 18, an iodine ion appears at anode 20. Operation then commences with iodide ordinarily to the left of electrode 18 and iodine and iodide to the right. Electrodes are described as input and output integrator anode 14, output integrator cathode 16, separation cathode 18, and separation anode, but input cathode 20. Basic circuitry is as follows. Separation cathode 18 is connected to the negative side of battery 31 and separation anode 20 to the positive side of battery 31. Separation of iodine takes place as described above since iodine is reduced to iodide at electrode 18 and iodine appears at electrode 20. Anode 14 is connected to an electrical signal source, for this description, the positive side of a battery 32, and cathode 20 to the negative side of battery 32. Iodide is then oxidized to iodine at anode 14 and iodine is reduced to iodide at cathode 20. The change of iodine concentration at the input electrode 14 is a function of current flow according to Faraday's law. An integral of this current flow is provided by connecting the positive side of a battery 33 to anode 14 and the negative side to cathode 16 with an ammeter 34 in the line. Because free iodine concentration increases in the integrator chamber during the redox process, the change is indicated by the microammeter as an output current proportional to the integral value of the input current. It is, of course, understood that the circuit as described is merely exemplary and that various modifications may take place although the process as described remains essentially the same. Input to the solion is described with relation to battery 32 as an example since this input is from a power source generally.

An additional and preferred modification of this invention is illustrated in FIG. 3, where the required volumes are achieved by providing the graphite electrodes as cup shaped or in the form of hollow cylinders having one closed end. A pair of such hollow cylinders 35 and 35' are illustrated as positioned in base-to-base relationship and separated by a spacer 36 such as a quartz fiber or Pyrex glass sleeve. This arrangement is substituted for electrodes 18 and 20 of FIG. 2. The cylindrical electrodes not only define specific volumes, but also supply larger electrode surfaces to the electrolyte while at the same time reducing the distance of travel of an ion for the redox process.

In addition to the cost and assembly advantages as described, operation of the solion integrator in accordance with the teachings of this invention has been compared to similar devices utilizing metal electrodes. The important feature, leakage rate, i.e., ionic leakage from the integrator chamber between electrodes 14 and 16, is improved over former solions.

While a specific method and apparatus in accordance with this invention has been shown and described, it is not intended that the invention be limited to the particular description nor to the particular configurations illustrated, and it is intended by the appended claims to cover all modifications within the spirit and scope of this invention.

What we claim as new and desire to secure by Letters Patent of the United States is:

1. In an electrochemical solion integrator device including electrodes in an electrolytic solution the combination comprising, a Pyrex glass tube sealed at each end and a redox system electrolyte in the sealed tube, a porous graphite electrode disk positioned concentrically within said tube and sealing means sealing said disk electrode to said tube, said sealing means including a necked down portion of said tube engaging the rim of said disk, said disk providing a chamber of electrolyte on either side thereof and an electrolytic circuit therethrough, and electrical contact means to connect said disk to a source of power so that said solion device operates as a solion integrator.

2. A solion integrator device comprising in combination, a hermetically sealed tubular glass housing, a redox system electrolyte in said housing, a first input anode electrode arranged in one end of said housing, a second input cathode electrode at the other end of said housing, said first and said second electrodes defining a chamber therebetween to contain electrolyte, a third integrator cathode electrode positioned between said first and second electrodes and spaced closely to said first electrode, a fourth separator cathode positioned between said third and said second electrode so that an electrolyte circuit extends through said third and fourth electrode, at least said third electrode being composed of a porous graphite, and electrical connection means for connecting each of said electrodes externally of said housing to provide a redox system and a time integral of current flow.

3. The solion integrator device substantially as recited in claim 2 wherein said porous graphite electrode is spectroscopically pure graphite having a density of from 1.6 to 1.7 grams/cm.$^3$, and said glass is Pyrex glass which is deformed to engage the periphery of said graphite electrodes.

4. A solion integrator device comprising in combination, a hermetically sealed tubular Pyrex glass tube, a redox system electrolytic solution in said tube, a first input anode electrode at one end of said housing, a second input cathode at the other end of said housing, a third integrator cathode electrode positioned between said first and second electrodes and spaced closely to said first electrode, a fourth separator cathode positioned between said third and said second electrode so that an electrolyte circuit extends through said third and fourth electrode, at least said third and fourth electrodes being composed of a porous graphite, said electrodes being in the form of discs having a rim periphery and front and back surfaces, said disks being concentrically positioned in axially spaced apart relationship within said tube to define chambers therebetween to contain said electrolytic solution, and electrical connection means connecting each of said electrodes externally of said housing to provide a redox system and a time integral of current flow.

5. The solion integrator device substantially as recited in claim 4 wherein said tube is necked down under heat and pressure to engage only the rim of each of said electrodes.

6. The solion integrator device substantially as recited in claim 4 wherein each of said second and fourth electrodes comprises a porous graphite body in the form of a hollow cylinder with one closed end and positioned in closed end to closed end concentric relationship.

7. The solion integrator device substantially as recited in claim 6 wherein at least said third and fourth porous graphite electrodes are composed of graphite of spectroscopic purity with a density between about 1.6 to 1.7 grams/cm.$^3$.

References Cited by the Examiner

UNITED STATES PATENTS

| | | | |
|---|---|---|---|
| 865,093 | 7/07 | Faria | 317—233 |
| 2,644,902 | 7/53 | Hardway | 317—231 X |
| 2,800,616 | 7/57 | Becker | 317—230 |
| 2,896,095 | 7/59 | Reed et al. | 317—231 X |
| 3,021,482 | 2/62 | Estes | 317—231 |

DAVID J. GALVIN, *Primary Examiner.*

JAMES D. KALLAM, *Examiner.*